United States Patent Office 3,584,119
Patented June 8, 1971

3,584,119
VAGINAL DOUCHE COMPOSITION
Daniel B. Langley, Naples, Fla., assignor to Langyn Laboratories, Inc., Rockville, Md.
No Drawing. Filed June 12, 1967, Ser. No. 645,500
Int. Cl. A61u 27/00
U.S. Cl. 424—148
7 Claims

ABSTRACT OF THE DISCLOSURE

A composition soluble in water and useful as a vaginal douche comprising a detergent, a persulfate, for example, an alkali metal monopersulfate, and a borate, for example, an alkali metal tetraborate. The preferred composition is a mixture of 5 parts by weight of sodium lauryl sulfate, 3 parts by weight of potassium monopersulfate and 7 parts by weight of sodium tetraborate decahydrate.

BACKGROUND OF THE INVENTION

The present invention relates to a composition suitable and effective for use as a vaginal douche. More particularly, the invention relates to a composition of ingredients which, when put into solution, provides an effective relief for the painful and disturbing symptoms of vaginal discharge, burning and itching and which promotes the healing and cleansing of the vaginal canal in the female.

During the past fifteen years, many gynecologists have changed their thinking concerning the use of the vaginal douche and, today, they find it a useful adjunct in the treatment of vaginitis, either as the sole therapy or, more frequently, in conjunction with intravaginal instillations of medicated tablets, creams or jellies. Douching is recommended in the routine of diaphragm contraception. In vaginal surgery, pre-operative douching is a generally accepted procedure.

Thus, the widespread use of vaginal douching by women indicates that the vaginal douche has certain important positive values. Douching may serve a brief palliative purpose, temporarily removing by mechanical one of the principal reasons for employing a vaginal means substances deposited in the vaginal canal. This is douche.

Douching in the home is generally carried out in the bathtub with the use of a douche bag. A warm water solution of about 1 to 2 quarts of water and certain ingredients are normally used. For example, an acid douche can be made by adding 4 tablespoonfuls of white vinegar to 2 quarts of warm water. Another commonly used douche solution consists of ¼ teaspoonful of iodine tincture U.S.P. per quart of warm water.

However, in spite of the common practice of women in using vaginal douches, the vaginal douche has been the most neglected therapeutic and hygienic measure in the field of obstetrics and gynecology. As the result of a great amount of research on the subject, the present inventor, being dissatisfied with the usual douche powders and douche liquids generally used, including such simple remedies as vinegar and the like, has found a safe and effective powder which may be used in a douche solution.

Accordingly, one of the objects of the present invention is to provide a combination of ingredients which may be safely and effectively used as a vaginal douche solution, which overcomes the disadvantages and deficiencies of the prior art.

Another object of the present invention is to provide a greatly needed novel douche composition.

Still another object of the invention is to provide a composition which may be readily dissolved in water to provide a solution which can be used in a conventional manner and with conventional means.

Yet another object of the present invention is to provide a healing and cleansing composition for the vaginal areas of the female which is safe, effective and economical.

These and other objects and advantages of the present invention will become apparent to those skilled in the art from a consideration of the following specification and claims.

SUMMARY OF THE INVENTION

In accordance with the present invention, it has been found that a composition comprising, as the active ingredients, a water-soluble detergent, a water-soluble bactericide and a water-soluble buffering agent for eliminating any excess harshness from the detergent is an effective mixture which may be dissolved in water to give a vaginal douche solution capable of attaining the objects outlined hereinabove. The active ingredients comprise a detergent, a persulfate and boric acid or a borate salt thereof as the buffering agent. In particular, the persulfate is advantageously an alkali metal (sodium or potassium) monopersulfate, and the borate is an alkali metal tetraborte.

A preferred composition in accordance with the present invention comprises, as the active ingredients, sodium or potassium lauryl sulfate, sodium or potassium monopersulfate and sodium or potassium tetraborate decahydrate (borax). The ingredients of the composition may be used in a proportion of from 3 to 8 parts by weight of the detergent, from 2 to 5 parts by weight of the persulfate and from 5 to 10 parts by weight of the borate, i.e., in a range of proportions, by weight, of 3–8:2–5:5–10, respectively.

The vaginal composition of the present invention clears the vaginal canal of the common and offending microorganisms so commonly found there, i.e., *Trichomonas vaginalis*, the fungus Monilia, and the mixed microorganisms, Staphylococci, *Bacillus coli* and Flagellae. The composition described as the present invention, and particularly the preferred embodiments thereof, has given excellent results in the treatment of women over 55 years of age who suffered from conditions such as atrophic or senile vaginitis. Effective relief has also been experienced by elderly women who, because of their being a poor surgical risk, have been forced to wear a supporting pessary in order to given them relief from the symptoms caused by Prolapse, Cystocele and Rectocele. By the frequent use of the douche composition of the present invention, these women may wear such supporting pessaries without usual irritation, discharge and, above all, the most disturbing element, the ever-present "embarrassing odor" associated with this very common female problem.

The douche described herein is also useful in the field of infant and juvenile gynecology. Often a female infant is brought to the gynecologist with a thick, yellowish discharge, caused by the feces and urine from the diaper getting into the vaginal canal. In the past, gynecologists have had little means with which to treat such cases. Cortisone creams have been used and, in some instances, measures designed to toughen or mature the infant vagina, such as with estrogenic hormones, have been employed. However, in the experience of the present inventor, these measures of treatment were never the answer to the cure. With the preparation of the present invention, the mother can easily irrigate the infant's vaginal canal at bath time, using a soft rubber bulb syringe with the proper dilution. Juvenile females have also benefited by the use of the douche composition of the present invention for the many and various types of vaginal discharge that are found during adolescence.

Women who have used the douche preparation of the present invention have never experienced any allergic reaction or harmful side effects in any age group. The vaginal composition of the present invention is truly safe and effective for many vaginal problems.

The composition of the present invention is generally used in practice in any amount of 2 teaspoonfuls thereof of 2 quarts of warm water, which is the volume of the average douche bag. It is then administered from the bag by gravity from a height of about two feet with a tube placed in the vagina, thereby obtaining a ballooning effect to enable the douche solution to get into the folds, creases and crevices of the vaginal area. The amount of composition to be placed into water may be varied, depending upon the situation. For example, with children, about ½ teaspoonful per pint of water is sufficient.

An aqueous solution of the preferred composition of the present invention, i.e., that shown in Example 1 below, has a pHS of approximately 9.1 with concentrations thereof of from 5 to 60 grams per liter (about 0.6 to 7.2 tablespoonfuls per quart). Heating and cooling of the solution does not significantly change the pH value thereof. Thus, the solution may be prepared with warmer water than is desired in the actual application in order to increase the solubility rate of the composition in water without affecting the pH. Of course, the solution would be cooled to the proper temperature before use.

At high concentrations, the douche preparation exhibits a strong buffering action. For example, the inflection point of the acid-base curve for a 30 gram per liter solution of the composition of Example I is at a pH of 9.1, the inflection point being theoretically the point of maximum buffering. At lower concentrations, the buffering action is less pronounced, or in other words, is pronounced over a shorter range.

EXAMPLES OF THE INVENTION

The following examples are given merely as illustrative of the present invention and are not to be considered as limiting. The numbers shown indicate milligrams of parts by weight of the recited ingredients. In each case, only the active ingredients, in accordance with the present invention, are shown, but it is to be understood that other minor ingredients may be added to the described compositions, as desired.

EXAMPLE I

Sodium lauryl sulfate _____ 500.0
Potassium monopersulfate _____ 300.0
Sodium tetraborate decahydrate _____ 686.0

EXAMPLE II

Sodium lauryl sulfate _____ 500.0
Potassium monopersulfate _____ 500.0
Sodium tetraborate decahydrate _____ 490.0

EXAMPLE III

Sodium lauryl sulfate _____ 300.0
Potassium monopersulfate _____ 200.0
Sodium tetraborate decahydrate _____ 980.0

EXAMPLE IV

Sodium lauryl sulfate _____ 300.0
Potassium monopersulfate _____ 200.0
Sodium tetraborate decahydrate _____ 490.0

EXAMPLE V

Sodium lauryl sulfate _____ 300.0
Potassium monopersulfate _____ 500.0
Sodium tetraborate decahydrate _____ 490.0

EXAMPLE VI

Sodium lauryl sulfate _____ 800.0
Potassium monopersulfate _____ 200.0
Sodium tetraborate decahydrate _____ 980.0

EXAMPLE VII

Sodium lauryl sulfate _____ 800.0
Potassium monopersulfate _____ 200.0
Sodium tetraborate decahydrate _____ 490.0

EXAMPLE VIII

Sodium lauryl sulfate _____ 300.0
Potassium monopersulfate _____ 300.0
Sodium tetraborate decahydrate _____ 686.0

Example I shows the preferred embodiment of the present invention, i.e., a weight proportion of about 5:3:7 of detergent to persulfate to buffering agent, respectively.

As noted above, other ingredients may be added to the compositions shown in order to promote their action. For example, the active ingredients of Example I may have added thereto 2.8 parts by weight of dodecyl benzyl sulfonate and 1.4 parts by weight of trichlorocarbanilide. It is also quite possible and effective to use in the described compositions, for instance, potassium lauryl sulfate, sodium monopersulfate, potassium tetraborate, boric acid or other suitable compounds.

The term "detergent," as used herein, is meant to refer to materials which have a cleansing action. Such materials include synthetic detergents, which are surface active agents and have structurally unsymmetrical molecules containing both hydrophilic, or water-soluble, groups and oil-soluble hydrocarbon chains. Most suitable in the present invention are the anionic detergents, which form negatively charged ions containing the oil-soluble portion of the molecule. The ionizable group is the hydrophilic portion. Examples thereof include the sodium salts of organic sulfonates or sulfates, in particular, the alkaryl sulfonates such as the sulfonates of dodecylbenzene and the sulfates of straight chain primary alcohols, either fatty alcohols or products of the Oxo process, such as sodium lauryl sulfate.

The invention being thus described, it will be obvious that the same way be varied in many ways. Such variations are not to be regarded as a departure from the spirit and scope of the invention, and all such modifications as would be obvious to one skilled in the art are intended to be included herein.

I claim:
1. A water-soluble composition useful as a vaginal douche comprising 3 to 8 parts by weight of a detergent selected from the group consisting of the sodium salt of a sulfonate of dodecylbenzene, sodium lauryl sulfate and potassium lauryl sulfate, 2 to 5 parts by weight of an alkali metal monopersulfate and 5 to 10 parts by weight of an alkali metal borate.

2. The composition of claim 1, wherein said monopersulfate is selected from the group consisting of sodium monopersulfate and potassium monopersulfate.

3. The composition of claim 1, wherein said borate is selected from the group consisting of sodium tetraborate and potassium tetraborate.

4. An aqueous solution comprising 5 to 60 grams per liter of the composition of claim 1.

5. A water-soluble composition useful as a vaginal douche comprising approximately 5 parts by weight of sodium lauryl sulfate, approximately 3 parts by weight of potassium monopersulfate and approximately 7 parts by weight of sodium tetraborate decahydrate.

6. An aqueous solution comprising 5 to 60 grams per liter of the composition of claim 5.

7. The composition of claim 2, wherein said borate is selected from the group consisting of sodium tetraborate and potassium tetraborate.

References Cited

Trussell: "Trichomonas Vaginalis and Trichomoniasis," publ. by Charles C. Thomas, Springfield, Ill., 1947, pp. 58, 173 and 209.

Remington's Pharmaceutical Sciences, 13th ed., 1965, pp. 260 and 270.

STANLEY J. FRIEDMAN, Primary Examiner

U.S. Cl. X.R.

424—164, 315; 252—99